United States Patent Office 3,329,710
Patented July 4, 1967

3,329,710
PREPARATION OF α-METHYL-β-(3,4-DIHYDROXY-PHENYL)-ALANINE
Hans Leuchs, Rudolf Lorenz, and Helmut Wieland, Wuppertal-Elberfeld, Germany, assignors to Farbenfabriken Bayer Aktiengesellschaft, Leverkusen, Germany, a corporation of Germany
No Drawing. Filed June 24, 1963, Ser. No. 290,162
Claims priority, application Germany, July 28, 1962, F 37,454
6 Claims. (Cl. 260—519)

The present invention relates to the production of α-methyl-β-(3,4-dihydroxyphenyl)-alanine by a novel and highly advantageous procedure and to a new intermediate therefor and its preparation.

α-Methyl-β-(3,4-dihydroxyphenyl)-alanine is known and is characterized by excellent blood pressure lowering activity and by being well tolerated. In making this compound, it has heretofore been considered necessary to utilize starting materials and intermediate compounds in which at least one of the two phenolic hydroxyl groups has been etherified by radicals which must be removed by hydrolysis as a final step. It is thus known to transform 3,4-dimethoxyphenyl acetone via the corresponding hydantoin into α-methyl-α-(3,4-dimethoxyphenyl)-alanine from which the α-methyl-β-(3,4-dihydroxyphenyl)-alanine can be obtained by prolonged boiling with concentrated hydrobromic acid.

In accordance with this previously known procedure, the protective groups which are, for example, alkyl or aralkyl radicals, were considered to be essential for the production of intermediate compounds leading to α-methyl-β-(3,4-dihydroxyphenyl)-alanine. This is due to the fact that the stability of the intermediate compounds with two free phenolic hydroxyl groups is relatively poor and the reactions required to obtain the desired end products are experimentally extremely difficult and sometimes impossible to carry out. Pyrocatechol and pyrocatechol derivatives having two free phenolic hydroxyl groups are very sensitive to oxidation, particularly in alkaline solutions, but also when they are in a moist state so that access of atmospheric oxygen leads to brown-red discoloration and extensive decomposition. Belgian Patent No. 604,858 states that 3,4-dihydroxyphenyl ketones are unsuitable as starting materials for the production of α-alkyl-β-(3,4-dihydroxyphenyl)-alanines for the foregoing reasons. Thus, for example, if 5-(3',4'-dihydroxybenzyl)-5-methylhydantoin, which is not described in the literature, is subjected to hydrolytic splitting under alkaline conditions in accordance with known procedure for the splitting of hydantoin rings, very dark discolored reaction solutions result from which badly contaminated α-methyl-β-(3,4-dihydroxyphenyl)-alanine can be isolated only with difficulty and in low yield.

In accordance with the present invention, it has now been found that 3,4-dihydroxyphenyl acetone can be converted in high yield without protection of the phenolic hydroxyl groups and while avoiding any significant secondary reactions or decomposition into pure α-methyl-β-(3,4-dihydroxyphenyl)-alanine when the conversion of the 3,4-dihydroxyphenyl acetone is carried out via the hitherto unknown 5-(3',4'-dihydroxyphenyl)-5-methylhydantoin by means of alkaline or acidic hydrolysis and saponification in the presence of a reducing agent preferably in a non-oxidizing atmosphere with the exclusion of oxygen.

The reactions are illustrated by the following reaction scheme:

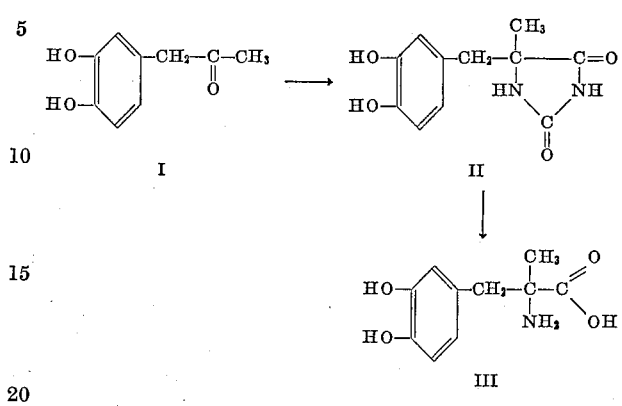

In the present new process delineated above, the splitting off of the relevant protective groups is obviated in contrast to previously employed processes wherein such was necessary. The previously employed processes were also uneconomic from a technical point of view. By the present invention the introduction of the protective groups at an earlier stage of the synthesis is avoided.

In producing 3,4-dihydroxybenzyl hydantoin (II), 3,4-dihydroxyphenyl acetone or its sodium bisulfite addition compound is reacted with an alkali metal cyanide and ammonium carbonate in aqueous or aqueous-alcoholic solution in the presence of a reducing agent and at a temperature ranging from 0° C. to 80° C. In a variation of the procedure, the reaction is carried out under increased pressure in an ammonia or carbon dioxide atmosphere.

Compound II can also be obtained by reacting the cyanohydrin, obtained from 3,4-dihydroxyphenyl acetone or its sodium bisulfite addition compound and hydrocyanic acid or an alkali metal cyanide, with ammonium carbonate under molten conditions, or in a suitable solvent at a temperature ranging from 30° C. to 100° C. The conversion of the hydantoin compound into α-methyl-β-(3,4-dihydroxyphenyl)-alanine is most advantageously carried out by heating it to a temperature somewhat above 100° C. and in the range of 140° C. to 170° C. with an aqueous alkali metal hydroxide solution in the presence of a reducing agent. Preferably, two to five times the molar amount of the alkali metal hydroxide which can, for example, be caustic soda or caustic potash, are used in the form of a 1 to 25 percent aqueous solution. Alternatively, prolonged heating to a temperature somewhat above 100° C. with a mineral acid such as concentrated hydrobromic acid can be used. In all cases, the reactions are most advantageously carried out with the exclusion of oxygen, i.e., in an inert or non-oxidizing gas atmosphere such as nitrogen or hydrogen or in acid solution under sulfur dioxide or carbon dioxide.

In the preferred procedure for the alkaline splitting of the hydantoin at an elevated temperature, a reducing agent is added which, under the given reaction conditions, does not react with the starting material or the end product. It has been found that a salt of pyrosulfurous acid such as sodium pyrosulfite or hydrazine, or other reducing agent such as Raney nickel, in the presence of hydrogen, is highly advantageous for carrying out the present process.

More specifically, it has been found preferable to heat the reaction solution obtained from the reaction of 3,4-dihydroxyphenyl acetone with sodium cyanide and ammonium carbonate in the presence of a reducing agent with an alkali metal hydroxide solution and alkali metal sulfite to a temperature in the range of 140° C. to 170° C. without previous isolation of the hydantoin formed. The excess alkali in the cold reaction solution is neutralized with dilute hydrochloric acid and the solution containing the alkali metal salt of the amino acid is subjected to spray drying in a current of warm air. Most surprisingly and unexpectedly, a dry product can be obtained in this way which has, at most, only a slight yellow coloration and from which pure α-methyl-β-(3,4-dihydroxyphenyl)-alanine can be recovered in high yield.

Processes which are generally known for the isolation of amino acids from aqueous solutions can be employed for the isolation of the α-methyl-β-(3,4-dihydroxyphenyl)-alanine obtained by the above method. The hydrolyzates obtained in the last step are evaporated to dryness, the resulting alanine derivative is extracted from the residue in the form of its salts with alcoholic acids such as acetic acid or hydrochloric acid in ethanol and precipitated from solution in the form of the free amino acid by neutralization, after which it is separated, washed and dried. If desired or preferred, a sulfurous acid salt, sulfurous acid or other reducing agent such as ascorbic acid, may be added for decolorization of the solutions obtained and for enhancing stability. The 3,4-dihydroxyphenyl acetone used as starting material is employed either in pure form or in the solution in which it was prepared from its functional derivatives by hydrolytic splitting reactions. The best starting material has been found to be 3,4-dihydroxyphenyl acetone ethylene ketal which can be readily obtained in pure form as a crystalline compound by redissolving it and then splitting it by heating for a short time with a catalytic amount of a mineral acid in aqueous alcoholic solution to give the desired 3,4-dihydroxyphenyl acetone.

The invention is illustrated by the following non-limitative example.

*Example*

200 grams of sodium pyrosulfite, 6.3 kilograms of ammonium carbonate and 3.07 kilograms of sodium cyanide are added to a solution of 8.3 kilograms of 3,4-dihydroxyphenyl acetone in 50 liters of water. The mixture is stirred for approximately sixteen hours at a temperature of 40° C., 5 kilograms of formic acid are then added and the mixture is stirred at 0° C. to 3° C. for one hour. The crystals which form are suction-filtered, washed with 10 liters of 0.2 percent hydrochloric acid at 0° C. and dried at 40° C. to 60° C. 11.09 kilograms of 5-(3',4'-dihydroxybenzyl)-5-methylhydantoin are obtained in a yield of 94 percent of theoretical in the form of crystals melting at 230° C. to 231° C. The product thus obtained is sufficiently pure for the following reaction: In an 80-liter autoclave provided with a nickel lining 10 kilograms of the above hydantoin compound are dissolved in a solution of 7.5 kilograms of sodium hydroxide in 30 liters of water in a nitrogen atmosphere. 500 grams of hydrazine hydrate are then added and the mixture is heated for two hours to a temperature of 170° C. to 180° C. Upon cooling the solution is stirred with 125 liters of glacial acetic acid and then further cooled to 0° C. to 5° C. After a few hours, crystals of α-methyl-β-(3,4-dihydroxyphenyl)-alanine separate out and are washed first with acetic acid and then with ethanol. When dried, the product is obtained in a yield of 8.0 kilograms (89.5 percent of theoretical) in the form of white crystals melting at 297° C. to 299° C. These crystals are very stable even when stored in the air.

What is claimed is:

1. A process for the production of α-methyl-β-(3,4-dihydroxyphenyl)-alanine which comprises adding ammonium carbonate and sodium cyanide to 3,4-dihydroxyphenyl acetone in the presence of a salt of pyrasulfurous acid, hydrazine or Raney nickel and hydrogen as a reducing agent to form 5-(3',4'-dihydroxybenzyl)-5-methylhydantoin, subjecting the 5-(3'-4'-dihydroxybenzyl)-5-methylhydantoin to alkaline or acidic hydrolysis in the presence of a salt of pyrosulfurous acid, hydrazine or Raney nickel and hydrogen as a reducing agent and recovering the α-methyl-β-(3,4-dihydroxyphenyl)-alanine from the products of hydrolysis.

2. A process according to claim 1 in which the hydrolysis is carried out under alkaline conditions.

3. A process according to claim 1 in which the reducing agent is an alkali metal salt of pyrosulfurous acid.

4. A process according to claim 1 in which the reducing agent is sodium pyrosulfite.

5. A process according to claim 1 in which prior to the formation of the hydantoin the 3,4-dihydroxyphenyl acetone is transformed into its sodium bisulfite addition compound.

6. A process for the production of α-methyl-β-(3,4-dihydroxyphenyl)-alanine which comprises
   (a) preparing 5-(3',4'-dihydroxybenzyl)-5-methylhydantoin by treating 3,4-dihydroxyphenyl acetone in aqueous solution with ammonium carbonate and sodium cyanide in the presence of a salt of pyrosulfurous acid, hydrazine or Raney nickel and hydrogen as a reducing agent;
   (b) treating the 5-(3',4'-dihydroxyphenyl)-4-methylhydantoin in alkaline solution in a non-oxidizing atmosphere with hydrazine hydrate and then with acetic acid; and
   (c) recovering the resulting crystals of α-methyl-β-(3,4-dihydroxyphenyl)-alanine.

References Cited

UNITED STATES PATENTS

| | | | |
|---|---|---|---|
| 1,285,703 | 11/1918 | Hermanns | 260—309.5 |
| 2,460,747 | 2/1949 | Henze | 260—309.5 |
| 2,591,103 | 4/1952 | Spurlock | 260—309.5 |
| 2,759,002 | 8/1956 | Close | 260—309.5 |
| 2,950,315 | 8/1960 | Anthone | 260—519 |
| 2,986,578 | 5/1961 | Kaneko et al. | 260—519 |

FOREIGN PATENTS 945,892   1/1964   Great Britain.

LORRAINE A. WEINBERGER, *Primary Examiner.*

NICHOLAS S. RIZZO, *Examiner.*

L. ARNOLD THAXTON, NATALIE TROUSOF,
*Assistant Examiners.*